UNITED STATES PATENT OFFICE 1,942,827

TERTIARY ALKYL SUBSTITUTED ORTHO-DIHYDROXY BENZENES

Lindley E. Mills and Bruce L. Fayerweather, Midland, Mich., assignors to The Dow Chemical Company, Midland, Mich., a corporation of Michigan No Drawing. Application March 27, 1933
Serial No. 663,102

3 Claims. (Cl. 260—154)

The present invention regards a new class of compounds, namely, the 1:2-dihydroxy-4-tertiary-alkyl benzenes.

We have prepared several of the aforementioned compounds, determined certain physical properties thereof whereby they may be readily identified, and found that they may advantageously be used for various purposes, for example in the inhibition of gum formation in petroleum distillates such as gasoline. The invention, then, consists of the new products hereinafter fully described and particularly pointed out in the claims.

We have found that the 1:2-dihydroxy-4-tertiary-alkyl benzenes may be prepared by the hydrolysis of a 2-halo-4-tertiary-alkyl-1-oxybenzene in the presence of cuprous oxide.

The compounds included within the scope of our invention have the following general structural formula; wherein R represents a tertiary-alkyl group.

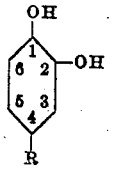

The compounds are white, crystalline substances; very slightly soluble in water, either cold or hot; very soluble in gasoline, benzene, alcohol, acetone, ether, and most other organic solvents. They are soluble in dilute alkali metal hydroxide solution, such solutions upon exposure to air rapidly becoming colored. For instance, 1:2-dihydroxy-4-tertiary-butyl benzene dissolved in dilute sodium hydroxide becomes green in contact with air, then turns to brown, and then crimson.

The following examples show in detail the method used in preparing certain specific members of our new class of compounds and describe the physical properties of some of the individual members.

*Example 1.—1:2-dihydroxy-4-tertiary-butyl benzene*

A solution was prepared containing 210 grams (5 moles) of sodium hydroxide and 3800 grams (210.5 moles) of water. To this solution was then added 229 grams (1.0 mole) of 2-bromo-4-tertiary-butyl-1-oxybenzene, and 20 grams (0.14 mole) of cuprous oxide. The reaction mixture was then refluxed over a period of 2 hours, filtered to remove the catalyst, and acidified with concentrated hydrochloric acid. On cooling, a dark, viscous, oily layer containing the new compound separates out. The reaction mixture was extracted with ethylene chloride. The ethylene chloride was distilled off to recover the same, and the residue then distilled under reduced pressure to obtain 116 grams of 1:2-dihydroxy-4-tertiary-butyl benzene. This represents a 70 per cent of theoretical yield. The compound has the structural formula:

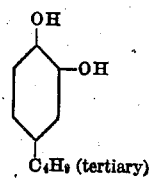

The compound melts at approximately 47°–48° C. to a thick viscous liquid. It boils at 144°–147° C. under an absolute pressure of 5 millimeters of mercury. It has a specific gravity of 1.047 at 60° C.; is soluble in water only to the extent of 0.25 per cent at 100° C., and 0.20 per cent at 25° C.; and is very soluble in most organic solvents.

*Example 2.—1:2-dihydroxy-4-tertiary-amyl benzene*

A solution was prepared containing 210 grams (5 moles) of sodium hydroxide and 3800 grams (210.5 moles) of water. To this solution was then added 243 grams (1 mole) of 2-bromo-4-tertiary-amyl-1-oxybenzene and 20 grams (.14 mole) of cuprous oxide. The reaction mixture was then refluxed for a period of about 2 hours, filtered to remove the catalyst, and acidified with concentrated hydrochloric acid. On cooling, a dark, viscous, oily layer containing the new compound separates out. The reaction mixture was extracted with three portions of ethylene chloride. The extract was then distilled under reduced pressure to recover the ethylene chloride, and to obtain 112 grams of 1:2-dihydroxy-4-tertiary-amyl benzene. This represents a 62 per cent of theoretical yield. The compound has the structural formula:

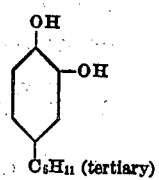

The compound melts at approximately 46.5°–47° C. and boils at 139°–142° C. under an absolute pressure of 2.5 millimeters of mercury. It is soluble in water only to the extent of 0.12 per cent at 25° C., but is very soluble in organic solvents, such as gasoline, benzene, acetone, etc.

*Example 3.—1:2 - dihydroxy - 4 - tertiary - butyl benzene*

The preparation of the foregoing compound from 1:2-dihydroxy benzene and tertiary-butyl chloride was accomplished in the following manner:

110 grams (1 mole) of 1:2-dihydroxy benzene, 138.75 grams (1.5 moles) of tertiary-butyl chloride, and 10 grams (0.073 mole) of anhydrous zinc chloride were mixed together in a flask equipped with a reflux condenser. The temperature of the reaction mixture was raised to 40° C. and maintained thereat for a period of 48 hours, with intermittent shaking. The reaction mixture was then cooled, extracted with ethyl ether, the ether distilled off, and the residue fractionated under reduced pressure. The yield of 1:2-dihydroxy-4-tertiary-butyl benzene obtained was 154 grams, representing a yield of 93.6 per cent of theoretical.

Other 1:2-dihydroxy-4-tertiary-alkyl derivatives, such as the tertiary-hexyl, heptyl, octyl, etc., may be prepared in similar manner.

We have determined that our new class of compounds can be incorporated with gasoline to inhibit the formation of gums therein. The solubility of the compounds in gasoline is so great that concentrated solutions thereof can be readily prepared, and such concentrated solutions diffuse perfectly throughout large quantities of gasoline upon the introduction of small amounts thereinto. The proportion of the foregoing compounds which we have found sufficient in admixture with gasoline to suppress decomposition or gum formation therein is exceedingly small, e. g. between about 0.001 and 0.05 per cent by weight.

Our new compounds may also be employed as stabilizers for insecticide compositions, such as pyrethrum and rotenone. They may also be used as antioxidants in vegetable and animal fats, waxes, soaps, etc.

Other modes of applying the principle of our invention may be employed instead of the one explained, change being made as regards the materials employed, provided the product claimed in the following claims be thereby obtained.

We therefore particularly point out and distinctly claim as our invention:—

1. 1:2 - dihydroxy - 4 - tertiary - alkyl benzene having the following structural formula; wherein R represents the tertiary-alkyl group:

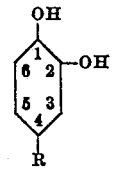

2. 1:2-dihydroxy-4-tertiary-butyl benzene.
3. 1:2-dihydroxy-4-tertiary-amyl benzene.

LINDLEY E. MILLS.
BRUCE L. FAYERWEATHER.